United States Patent [19]

Lim

[11] Patent Number: 5,423,085

[45] Date of Patent: Jun. 6, 1995

[54] METHOD AND APPARATUS FOR DIGITAL AUTOMATIC FREQUENCY CONTROL OF TDM COMMUNICATIONS SYSTEMS

[75] Inventor: Mu-gil Lim, Seoul, Rep. of Korea

[73] Assignee: Samsung Electronics Co., Ltd., Kyunki-do, Rep. of Korea

[21] Appl. No.: 125,853

[22] Filed: Sep. 24, 1993

[30] Foreign Application Priority Data

Mar. 31, 1993 [KR] Rep. of Korea .............. 93-5201

[51] Int. Cl.[6] .................................. H04B 1/10
[52] U.S. Cl. ..................... 455/182.2; 455/192.2; 455/264; 375/344
[58] Field of Search ............... 455/182.2, 182.1, 192.2, 455/192.1, 196.1, 264, 265; 375/97, 94; 370/95.3

[56] References Cited

U.S. PATENT DOCUMENTS 3,163,823 12/1964 Kellis et al. .................. 455/182.1
4,696,056 9/1987 Morita ......................... 455/182.1
4,814,887 3/1989 Marz et al. .................... 455/182.2
5,228,062 7/1993 Bingham ....................... 375/97

Primary Examiner—Edward F. Urban
Assistant Examiner—Doris To
Attorney, Agent, or Firm—Lowe, Price, Leblanc & Becker

[57] ABSTRACT

An automatic frequency control method re-modulates a binary data sequence output from an equalizer using the convolution of an estimated channel characteristic value function and a transfer function of the modulator in the transmitter of a communication system, to obtain a reference phase. The reference phase then is compared with a receiving phase to produce a phase error value. The phase error value is converted into a frequency error value, which is then converted into an analog control voltage and applied to a voltage controlled oscillator. Apparatus for performing the method includes an equalizer, a channel characteristic estimator, a re-modulator, a phase comparator, a frequency error estimator and a digital-to-analog converter, to thus improve the receiving performance of a receiver by digital implementation.

7 Claims, 6 Drawing Sheets

METHOD AND APPARATUS FOR DIGITAL AUTOMATIC FREQUENCY CONTROL OF TDM COMMUNICATIONS SYSTEMS

BACKGROUND OF THE INVENTION

The present invention relates to an automatic frequency control apparatus, and more particularly to an automatic frequency control method and apparatus thereof which can be utilized in a receiver of a digital mobile communication system that applies a time-division multiplex communication system to a radio channel.

Mobile communication is a field that expects much demand in the future, and an automatic frequency control apparatus is absolutely required for the receiving-end thereof in order to prevent the deterioration of the receiving strength according to multi-path fading.

The circuitry of an automatic frequency control apparatus which constitutes the conventional receiving-end has a general analog-type phase-locked loop circuit, which complicates the circuitry of the receiving-end, and the implementation should be implemented in a discrete circuit. In other words, it is difficult for the conventional frequency automatic control apparatus to be implemented in a semiconductor integrated circuit.

Another conventional automatic frequency control apparatus which is not a discrete circuit type, is explained using FIG. 1 as follows:

Referring to FIG. 1, analog-to-digital converters (ADC) 101 and 102 convert the I-channel and Q-channel analog signals into digital form, while a carrier frequency deviation detector 103 detects a frequency deviation, i.e., a frequency error, using the I-channel and Q-channel signal which are converted into digital signals. The frequency error detected by a carrier frequency deviation detector 103 is changed into control voltage data of a voltage controlled oscillator that corresponds to the frequency error by a random walk filter 104, counter 105, logical product means 107 and a mode controller 106. A selector 108 selects and produces a predetermined initial value which is applied from carrier frequency deviation detector 103 when the automatic frequency controlling is initiated, and otherwise, selects to produce the output of counter 105. Thus, the output of selector 108 is converted into an analog-type control voltage by a digital-to-analog converter 109, and then is applied to a voltage controlled oscillator VCO, to thereby accomplish automatic frequency control. Here, the method of detecting frequency deviation by carrier frequency deviation detector 103 produces a compensation factor using the following expression (1) which is applicable only when the receiving signal accords to the $\pi/4$ QPSK method.

$$\delta\omega T = \tan^{-1}\left(\frac{V_Q}{V_I}\right) - \frac{\pi}{4}\,\text{sgn}(V_I V_Q) \tag{1}$$

Here, $\delta\omega$ represents an angular frequency deviation, $V_I$ and $V_Q$ are the I-channel signal and Q-channel signal, respectively, T is a symbol cycle, and sgn represents a function that detects a sign(+ or −).

That is, an automatic frequency control apparatus shown in FIG. 1 has a defect in that its application field is limited because the frequency error is produced assuming that the phases of the I-channel and Q-channel mutually have regular relations (given that the modulator/demodulator method is $\pi/4$ QPSK). Here, too many additional elements are needed in constructing a receiving-end for an automatic frequency control apparatus, to thereby complicate the circuitry of a receiving-end.

SUMMARY OF THE INVENTION

Accordingly, it is an object of the present invention to provide an automatic frequency control method which decrease the number of elements to be added in constructing the receiving-end by using a constituent of demodulating a receiving-end as a structural element, to thereby reduce the complexity of a receiving-end and simultaneously improve a receiving performance.

It is another object of the present invention to provide an automatic frequency control apparatus which can perform the above method.

To accomplish the above objects, there is provided an automatic frequency control method for controlling the frequency of a carrier generated in a voltage controlled oscillator included in a receiver of a communication system which has time-variant channel characteristic, comprising the steps of:

writing a receiving signal which has been shifted to a baseband and converted into digital form, to a buffer;

reading out the receiving signal from the buffer and estimating the channel characteristic value of a channel through which the receiving signal has been transferred, based on a predetermined reference synchronized word included in the receiving signal;

equalizing the receiving signal using the channel characteristic value to produce a binary data of equalized result;

re-modulating the binary data of equalized result using a convolution value of a transfer function of the modulator in the transmitter and the channel characteristic value;

estimating a phase error value by comparing a reference phase value which is the phase of the signal resulted from the re-modulation and a receiving phase that is a phase value of the receiving signal;

converting the phase error value into the frequency error value; and converting the frequency error value into a control voltage in order to control the voltage control oscillator.

To accomplish another object of the present invention, there is provided an automatic frequency control apparatus for controlling the frequency of a carrier which is generated by a voltage controlled oscillator included in a receiver of a communication system which has time-variant channel characteristic, comprising:

a channel characteristic estimating means for receiving a receiving signal which has been shifted to a baseband and converted into digital form, and then estimating the channel characteristic value of a channel based on a predetermined reference synchronized word included in the receiving signal;

an equaling means for equalizing the receiving signal using the channel characteristic value to produce a binary data of equalized result;

a re-modulation means for re-modulating the binary data of equalized result using a convolution value of a transfer function of the modulator in the transmitter and the channel characteristic value;

a phase comparating means for estimating a phase error value by comparing a reference phase value which is the phase of the signal resulted from the re-modulation means and a receiving phase that is a phase value of the receiving signal;

a frequency error estimating means for converting the phase error value into the frequency error value; and a digital to analog converting means for converting the frequency error value into a analog form of control voltage, wherein the carrier frequency of the voltage controlled oscillator being varied in accordance with the control voltage generated from the digital to analog converting means.

To explain the present invention in brief, data output from an equalizer is re-modulated by applying the same method used in the transmission-end, which then is compared with the receiving signal to produce a phase error value which is in turn converted into a frequency error value. Then, a voltage that responds to the frequency error value is applied to a voltage controlled oscillator, to thereby make the voltage controlled oscillator output a frequency-controlled carrier signal.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
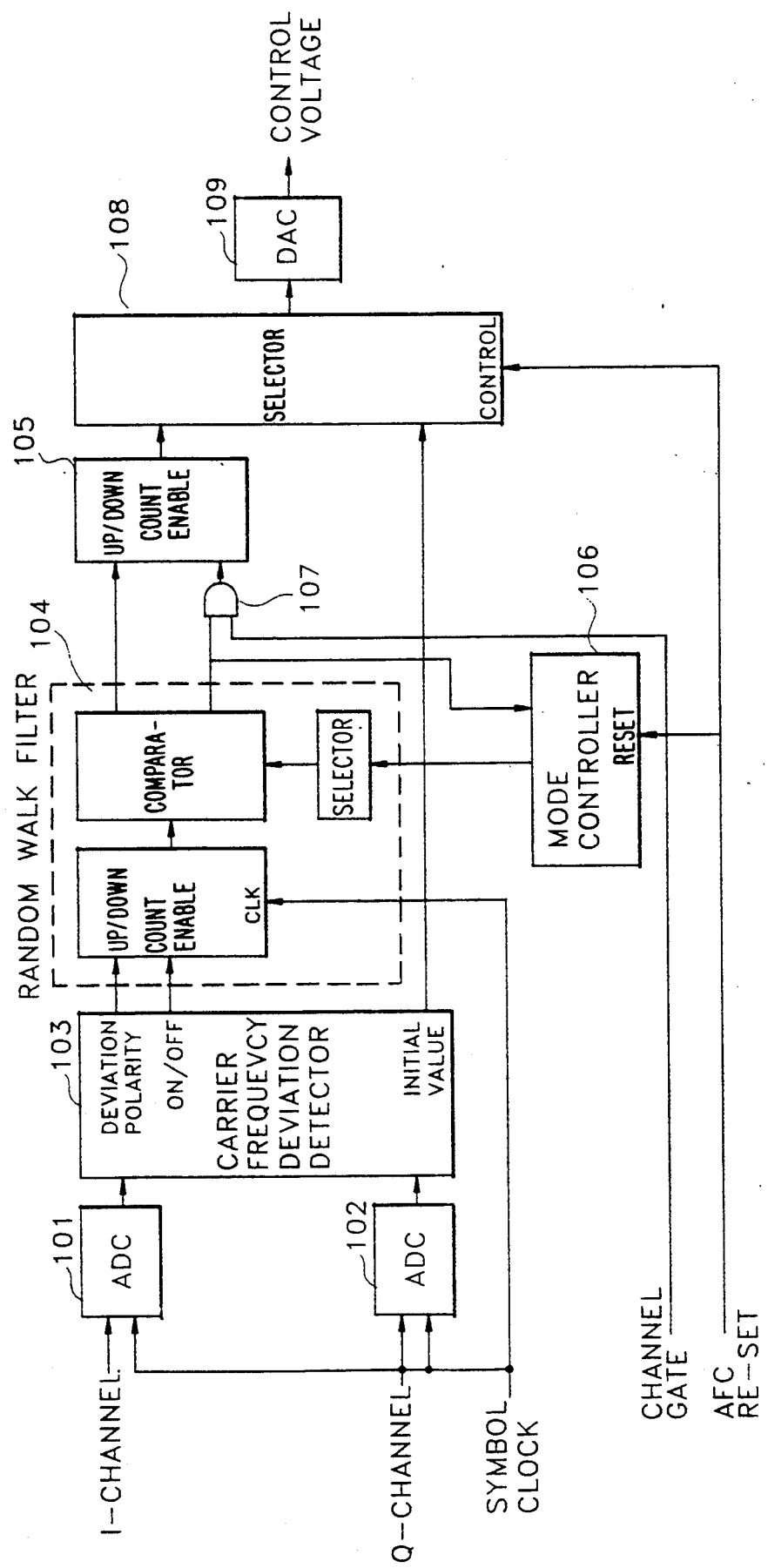
FIG. 1 is a block diagram showing an automatic frequency control apparatus according to the conventional technique.
Figure 2:
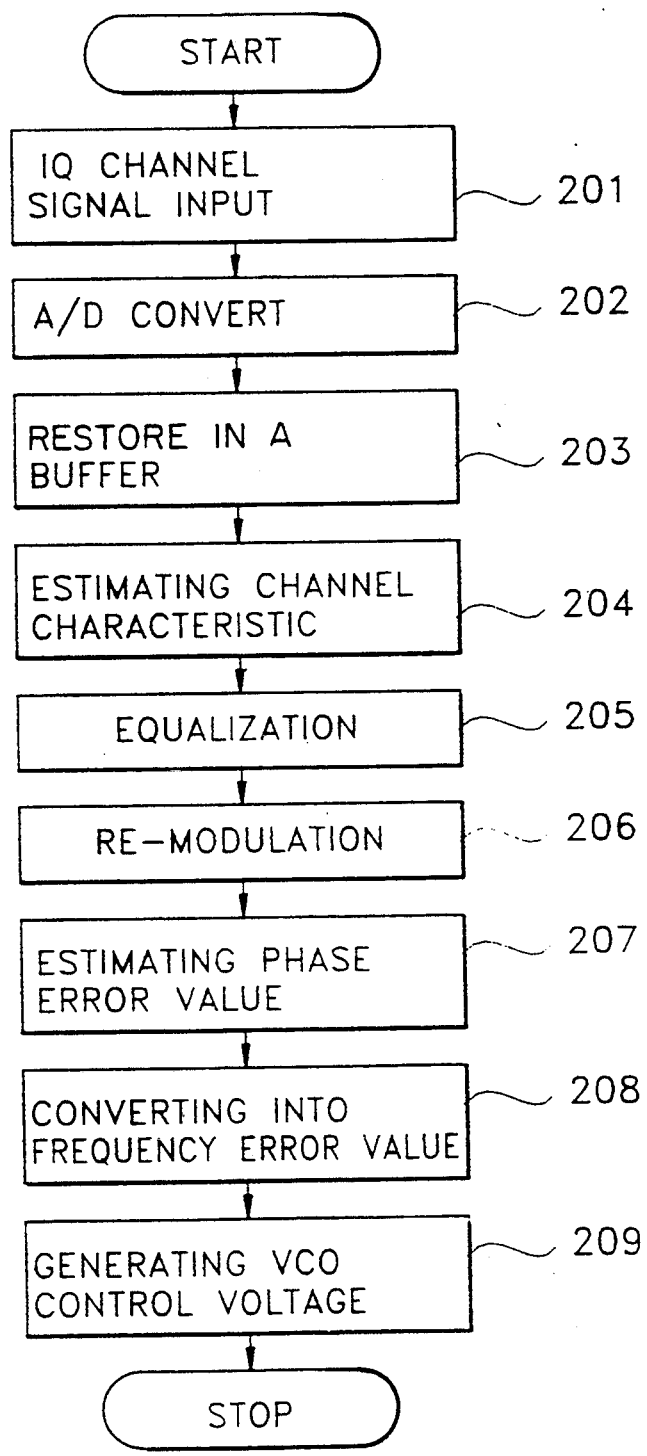
FIG. 2 is a flowchart showing an automatic control method according to the present invention.

FIG. 2 is a flowchart to explain an automatic frequency control method according to the present invention.

Referring to FIG. 2, step 201 is for receiving an I-channel signal and Q-channel signal, and the thus-input signals are converted into digital form in step 202, wherein the I-channel signal and Q-channel signal are over-sampled by n-times (n is a natural number of at least three, for a desirable soft-decision) of a data transmission rate and are converted into digital signals. I-channel signal and Q-channel signal which are converted into digital are restored in a buffer in step 203.

In step 204, a channel characteristic wherein a receiving signal is transmitted is estimated by comparing the basic synchronized word defined in the protocol with another basic synchronized word which is included in the receiving signal, transmitted and then detected. The channel characteristic is estimated so that the receiving signal is distorted by the multi-path fading of the channel in such a communication system as a digital mobile system. Step 205 equalizes the receiving signal by using the estimated value and then detects an adequate binary data sequence. Assuming that the transfer function of the modulator in the transmitter is g(t) and the channel characteristic value estimated in step 204 is h(t), step 206 re-modulates a receiving signal equalized in step 205 by using a convolution value g(t)h(t). Step 207 produces a phase error value by comparing the reference phase of the re-modulated signal in step 206 and the receiving phase of the receiving signal. The thus-produced phase error value is converted into a frequency error value in step 208, and then is converted into a control voltage that responds to the frequency error value in step 209, to be applied to the voltage controlled oscillator. Here, assuming that the phase error value is $\Delta\phi_e$ and the time that the time slot takes up is $\Delta t$, step 208 converts a frequency error value ($f_e$) using the expression:

$$2\pi f_e = \Delta\phi_e/\Delta t$$

which can be rewritten as $$f_e = \Delta\phi_e/2\pi\Delta t$$

A voltage controlled oscillator varies an oscillation frequency depending on the applied control voltage, to thereby make possible of an automatic frequency controlling. Here, the receiving signal among the signals which are compared with each other in step 207 can be the one producing the output of the present equalizer or one currently received. If the signal which is being received at the present time is used as is, the symbol used in general communication systems is expressed in microseconds, and the co-relationship of the signal is so strong that the difference can be ignored. Additionally, the phase error value produced in step 207 can be converted into a frequency error value in step 207 in every time slot, and/or the produced phase error values from several time slots are averaged and can be converted into a frequency error value. (Here, the phase error value produced in step 207 can also be converted into a frequency error value in every frame unit, because a receiver among a plurality of time slots included in each frame is allocated to one time slot and uses the allocated time slot.) When averaging the phase error values which are produced from several time slots, the performance can be further improved by converting the receiving strength of the received signals resulting from each time slot into weighted numerical values and then averaging and producing the converted signal strength. Hereinbelow, this will be explained in more detail.

First, assuming that the present time slot is kt, the phase error value produced from the three previous time slots, the present time slot and the next two time slots, can be represented as $\Delta\phi_e(kt-3t)$, $\Delta\phi_e(kt-2t)$, $\Delta\phi_e(kt-t)$, $\Delta\phi_e(kt)$, $\Delta\phi_e(kt+t)$, $\Delta\phi_e(kt+2t)$ ..., and the receiving strength produced in each time slot can be represented as $s(kt-3t)$, $s(kt-2t)$, $s(kt-t)$, $s(kt)$, $s(kt+t)$, $s(kt+2t)$ ... Assuming that the phase error value is produced by a weighted averaging of the phase error values of the four time slots, the phase error values $[\Delta\phi_e']$ which are weight averaged in the time slot kt, kt+t and kt+2t can be shown as follows:

$$\Delta\phi_e'(kt) = \frac{\Delta\phi_e(kt-3t)s(kt-3t) + \Delta\phi_e(kt-2t)s(kt-2t) + \Delta\phi_e(kt-t)s(kt-t) + \Delta\phi_e(kt)s(kt)}{s(kt-3t) + s(kt-2t) + s(kt-t) + s(kt)}$$

$$\Delta\phi_e'(kt+t) = \frac{\Delta\phi_e(kt-2t)s(kt-2t) + \Delta\phi_e(kt-t)s(kt-t) + \Delta\phi_e(kt)s(kt) + \Delta\phi_e(kt+t)s(kt+t)}{s(kt-2t) + s(kt-t) + s(kt) + s(kt+t)}$$

$$\Delta\phi_e'(kt+2t) = \frac{\Delta\phi_e(kt-t)s(kt-t) + \Delta\phi_e(kt)s(kt) + \Delta\phi_e(kt+t)s(kt+t) + \Delta\phi_e(kt+2t)s(kt+2t)}{s(kt-t) + s(kt) + s(kt+t) + s(kt+2t)}$$

Here, the receiving strength s(kt) can be replaced by "1" when only a few time slots are desired to be averaged without reflecting the receiving strength.

Though the above explanation is for averaging the phase error value, it is also possible to average or weighted average the frequency error value after converting the phase error value into the frequency error value as is, without averaging or weighted-averaging.

Weighted-averaging the frequency error value is explained as follows. As above, assuming that the present time slot is kt, the frequency error value converted from the phase error value which is produced from the three previous time slots, the present time slot and the next two time slots, can be represented as $\Delta f_e(kt-3t)$, $\Delta f_e(kt-2t)$, $\Delta f(kt-t)$, $\Delta f_e(kt)$, $\Delta f_e(kt+t)$, $\Delta f_e(kt+2t)$ . . ., and the receiving strength produced in each time slot can be represented as $s(kt-3t)$, $s(kt-2t)$, $s(kt-t)$, $s(kt)$, $s(kt+t)$, $s(kt+2t)$ . . .

Likewise, assuming that the frequency error value is produced by weighted averaging of the frequency error values of the four time slots, the frequency error values $\Delta f_e'$ produced from the weight averaging of the time slots kt, kt+t and kt+2t can be shown as follows:

$$\Delta f_e'(kt) = \frac{\Delta f_e(kt-3t)s(kt-3t) + \Delta f_e(kt-2t)s(kt-2t) + \Delta f_e(kt-t)s(kt-t) + \Delta f_e(kt)s(kt)}{s(kt-3t) + s(kt-2t) + s(kt-t) + s(kt)}$$

$$\Delta f_e'(kt+t) = \frac{\Delta f_e(kt-2t)s(kt-2t) + \Delta f_e(kt-t)s(kt-t) + \Delta f_e(kt)s(kt) + \Delta f_e(kt+t)s(kt+t)}{s(kt-2t) + s(kt-t) + s(kt) + s(kt+t)}$$

$$\Delta f_e'(kt+2t) = \frac{\Delta f_e(kt-t)s(kt-t) + \Delta f_e(kt)s(kt) + \Delta f_e(kt+t)s(kt+t) + \Delta f_e(kt+2t)s(kt+2t)}{s(kt-t) + s(kt) + s(kt+t) + s(kt+2t)}$$

Here, the above receiving strength s(kt) can be replaced by "1" when only a few time slots are desired to be averaged without reflecting the receiving strength so as to produce the frequency error value.

Additionally, though only the past time slots are reflected in the above explanation, it is also possible to reflect both the past time slots and the successive time slots, in weight averaging for producing the phase and frequency error values.

Figure 3:
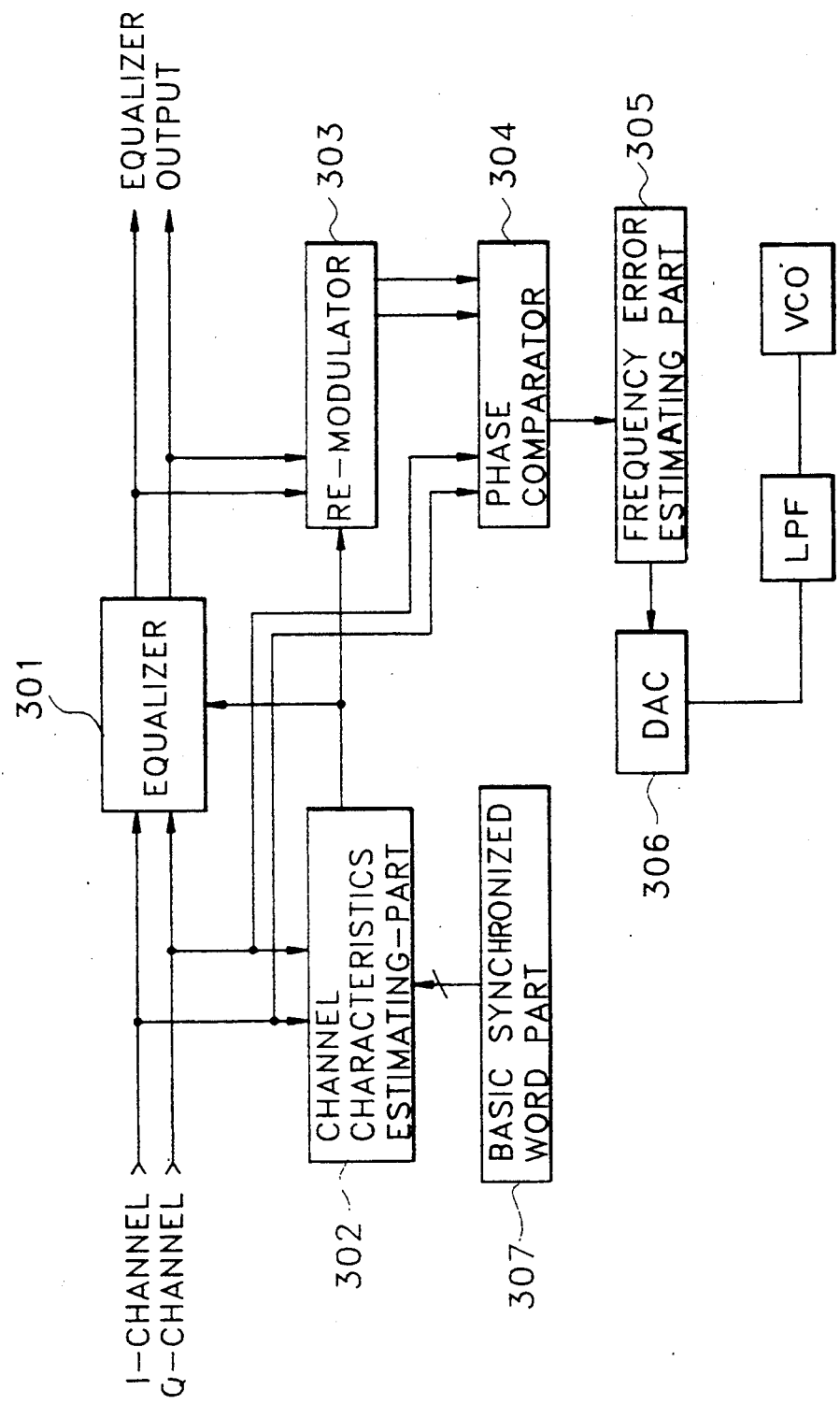
FIG. 3 is a block diagram showing an automatic frequency control apparatus system according to an embodiment of the present invention.

FIG. 3 is a block diagram showing an automatic frequency control apparatus according to the present invention, which comprises an equalizer 301, a channel characteristic estimating part 302, a re-modulator 303, a phase comparator 304, a frequency error estimating part 305, a digital-to-analog converter 306 and a basic synchronized word part 307.

Figure 4:
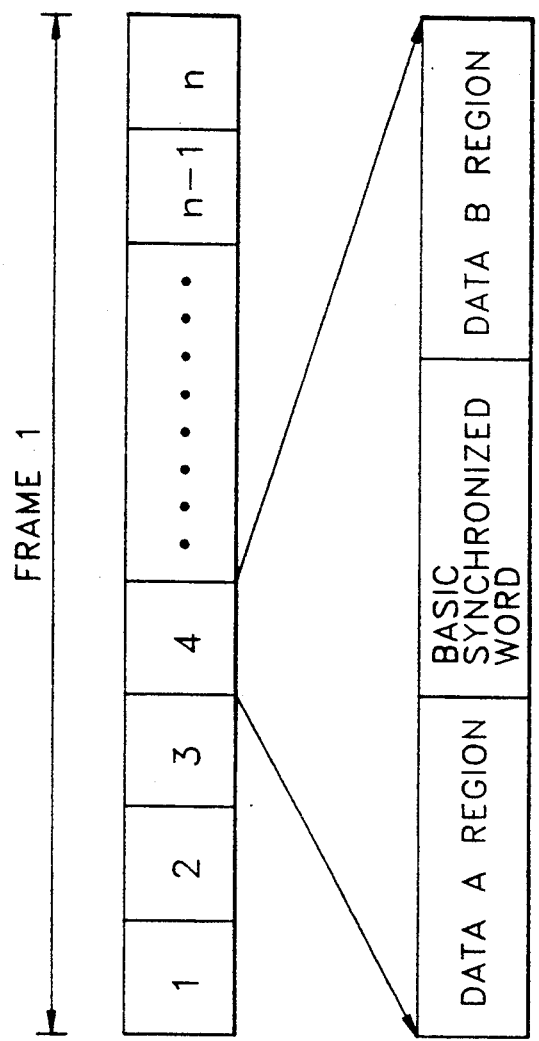
FIG. 4 is a schematic illustration showing the structure of a frame of a transmitted signal and a time slot.

Referring to FIG. 3, the basic synchronized word part 307 is a word table resulted from the sampling and the quantizing of the modulation signals for the basic synchronized words used in each time-division multiplexing (TDM) system, and produce the basic synchronized word used in the channel that corresponds to the receiving signal. Using this basic synchronized word, the channel characteristic estimating part 302 outputs an impulse response h(t), i.e. a channel characteristic, of the channel wherein the receiving signal of the present time slot is transmitted. The basis of producing the channel characteristic results from the fact that the transmitter inserts and transmits the basic synchronized word known by the receiver into a predetermined part of the transmission signal as shown in FIG. 4. The channel characteristic estimating part 302 is constituted in very different forms depending on the desired algorithm to be used. For the algorithm used in the channel characteristic estimating part 302, there are such methods as obtaining the correlation result value and block estimating when the auto-correlation of the basic synchronized word is not a Dirac pulse characteristic.

Thus, the channel characteristic is produced, by which the equalizer 301 equalizes the I-channel signal and Q-channel signal, and then detects and outputs the binary data sequence. The equalization is to prevent the receiving-end from increasing its bit error rate caused by the distortion of the time-varying transmission channel, and the proposed algorithm is a decision feedback equalization (DFE) method. Another method is maximum likelihood sequence estimation and is applied correspondingly the viterbi algorithm.

When the predetermined L-bit digital data for the time slot 1 is detected from the equalizer 301, the output of the equalizer 301 is remodulated in the re-modulator 303 using the convolution value g(t)*h(t) between the transfer function of the modulator g(t) used in the transmitter and the channel characteristic value h(t) produced from the channel characteristic estimating part 302. %1 Then, the sizes of the I-channel and Q-channel signals are produced.

A phase comparator 304 produces the receiving phase from the I-channel signal and Q-channel signal of the time slot which is being received presently, produces the basic phase from the I-channel signal and Q-channel signal output from the above re-modulator 303, and then produces the phase error value by comparing the receiving phase and the basic phase. The phases ($\theta$), such as a receiving phase, a basic phase and the like, is produced from each I-channel and Q-channel signal as follows:

$$\theta = \tan\left(\frac{Q}{I}\right)$$

Here, since the sizes of I-channel signal and Q-channel signal output from the re-modulator 303 are calculated per time slot when the basic phase is produced, the calculation amount is remarkably decreased as compared with the re-modulation of the entire signal. In addition to this, the synchronization is required for the receiving phase which is compared with the basic phase. Therefore, the appropriate delay and comparison of the receiving phase in the phase comparator 304 is needed.

The thus-produced phase error value is applied to the frequency error estimating part 305, is converted into the frequency error value according to the relational expression as is explained in FIG. 2, and then is applied to digital-to-analog converter 306, to thereby convert into an analog control voltage. Accordingly, the control voltage to reduce the frequency error value for the difference between the above basic phase and the receiving phase is applied to the voltage controlled oscillator, to thereby control its frequency so as to improve the reception performance.

Additionally, the output-end of the digital-to-analog converter 306 further comprises a low-pass filter so as to remove the high frequency constituents from the signals output from the digital-to-analog converter 306. This aims to remove the high-frequency noise generated when the digital signal is changed into an analog signal.

Figure 5:
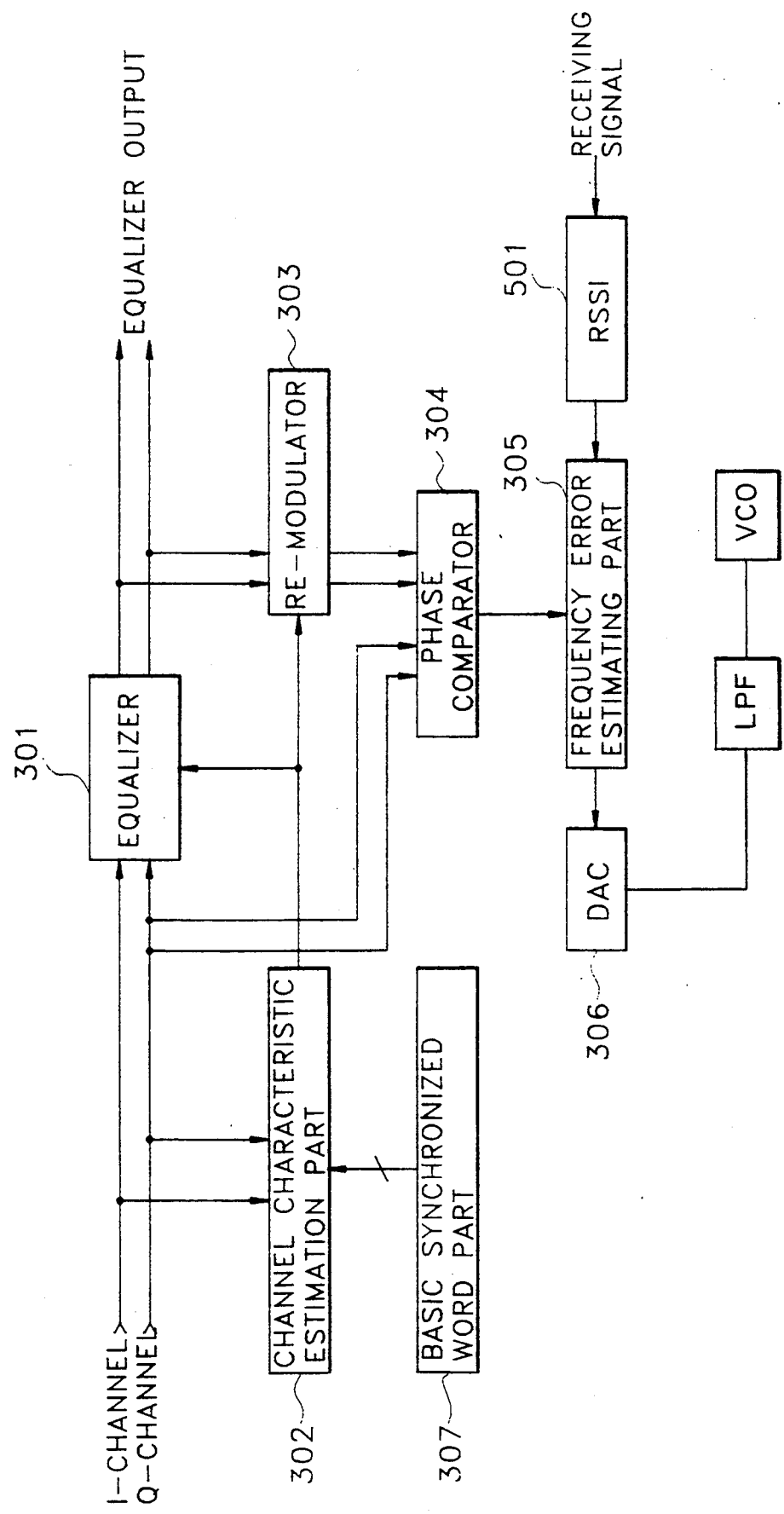
FIG. 5 is a block diagram showing an automatic frequency control apparatus according to another embodiment of the present invention.

FIG. 5 is a block diagram showing an automatic frequency control apparatus according to another embodiment of the present invention, which further comprises a receiving strength producing part 501 as compared with FIG. 3.

Figure 6:
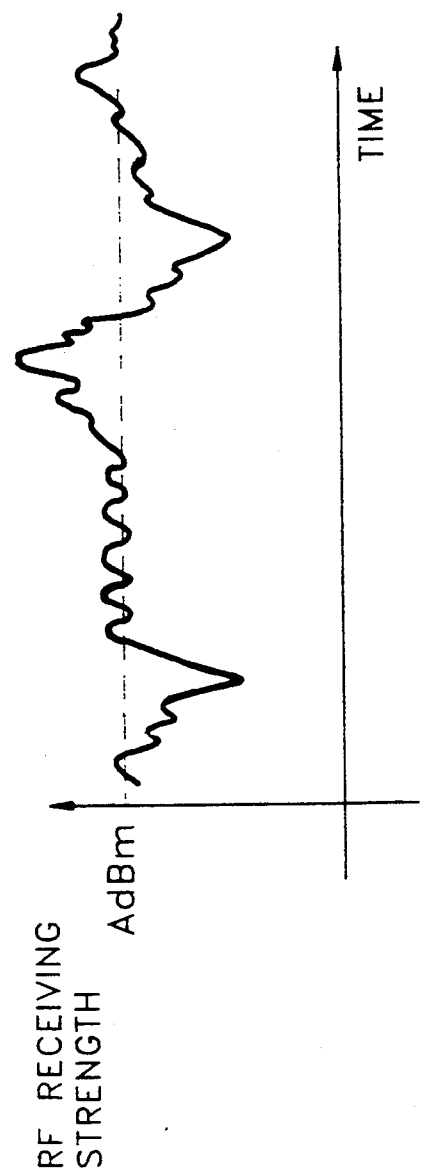
FIG. 6 is a graphical representation of a receiving strength over time.

Referring to FIG. 5, the receiving strength producing part 501 converts the strength of the receiving signal into a regular digital data value per each time slot, and then outputs the converted signal strength. FIG. 6 is a graphical representation of a time-varying receiving strength.

The receiving strength is produced by the received signal strength indicator 501 in every time slot, which then is used by the frequency error estimating part 305 as a weighted numerical value.

The explanation with respect to FIG. 2 can be the reference for more detailed contents. In other words, it is possible to convert the phase error value produced in each time slot into a weight-averaged phase error value, or the phase error value produced in each time slot can be converted into the frequency error value as is. Then, the frequency error value is weight-averaged.

Thus, using the frequency error value produced by reflecting various time slots can prevent an increase of a bit error which may appear as the suddenly changed channel characteristic is applied. In addition to this, better frequency controlling is possible because the receiving strength is reflected as the weighted value. The circuit shown in FIG. 5 also further comprises a low-pass filter connected to the output of digital to analog converter 306, in order to remove the high-frequency noise in the output signal of digital to analog converter 306.

As explained above, the present invention provides an automatic controlling method and apparatus for a carrier frequency of the receiving side of the system whose channel characteristic is time-varying as a wireless communication system, and it is possible to embody all the constituents with digital circuits, and for the receiving circuits to be integrated into one semiconductor chip. Further, the timing restoration is done in the course of equalization without ;requiring an additional circuit for timing restoration, and the circuitry is made simple, to thereby improve the overall performance of the receiving-end.

What is claimed is:

1. An automatic frequency control method for controlling frequency of a carrier generated using a voltage controlled oscillator included in a receiver of a communication system which has time-variant channel characteristic, comprising the steps of:

writing a receiving signal which as been shifted to a baseband and converted into digital form to a buffer;

reading out the receiving signal from the buffer and estimating a channel characteristic of a channel through which the receiving signal has been transferred, based on a predetermined reference synchronized word included in said receiving signal;

equalizing said receiving signal using said channel characteristic to produce binary data of equalized result;

re-modulating the binary data of equalized result using a convolution of a transfer function of a modulator in a transmitter and the channel characteristic;

estimating a phase error value by comparing a reference phase of a signal resulting from the re-modulation and a phase of said receiving signal;

converting said phase error value into a frequency error value; and converting said frequency error value into a control voltage in order to control said voltage control oscillator.

2. An automatic frequency control method according to claim 1, wherein said step of converting said phase error value, $\Delta\phi_e$, into said frequency error value, $f_e$, uses the expression $f_e 32 \Delta\phi_e/2\pi\Delta t$ where the time which one time slot takes up is $\Delta t$.

3. An automatic frequency control method according to claim 1, wherein said step of producing said phase error value is accomplished by a weight averaging of phase error values that correspond to several time slots, using measured receiving strength of each time slot as weighted value.

4. An automatic frequency control method according to claim 1, wherein said step of producing said frequency error value is accomplished by a weight averaging of frequency error values that correspond to several time slots, using measured receiving strength of each time slot as weighted value.

5. An automatic frequency control apparatus for controlling frequency of a carrier which is generated by a voltage controlled oscillator included in a receiver of a communication system which has time-variant channel characteristic comprising:

a channel characteristic estimating means for receiving a receiving signal which as been shifted to a baseband and converted into digital form, and then estimating a channel characteristic of a channel through which the receiving signal has been transferred, based on a predetermined reference synchronized word included in the receiving signal;

an equalizing means for equalizing the receiving signal using said channel characteristic to produce a binary data of equalized result;

a re-modulation means for re-modulating said binary data of equalized result using a convolution of a transfer function of a modulator in a transmitter and said channel characteristic;

a phase comparating means for estimating a phase error value by comparing phase of a signal resulted from said re-modulation and a receiving phase that is a phase value of said receiving signal;

a frequency error estimating means for converting said phase error value into a frequency error value; and a digital to analog converting means for converting said frequency error value into an analog form of control voltage, wherein the carrier frequency of the voltage controlled oscillator being varied in accordance with the control voltage generated from said digital to analog converting means.

6. An automatic frequency control apparatus according to claim 5, further comprising a low-pass filter for receiving an output of said digital-to-analog converting means and then transferring only a low-frequency component, to thereby remove noise of a high-frequency component.

7. An automatic frequency control apparatus according to claim 5, further comprising a received signal strength indicator, connected to said frequency error estimating means, for receiving said receiving signal to produce a sensing signal that indicates a receiving strength, wherein said frequency error estimating means produces a weight-averaged frequency error value of a predetermined number of time slots.

* * * * *